United States Patent [19]
Baker et al.

[11] 4,334,637

[45] Jun. 15, 1982

[54] EXTRUSION NOZZLE ASSEMBLY

[75] Inventors: Robert G. Baker, Buford; Dario J. Ramazzotti, Atlanta, both of Ga.

[73] Assignee: Nordson Corporation, Amherst, Ohio

[21] Appl. No.: 180,803

[22] Filed: Aug. 25, 1980

[51] Int. Cl.$^3$ .......... B60D 5/62

[52] U.S. Cl. .......... 222/146 H; 222/568; 219/230; 219/421; 239/600

[58] Field of Search .......... 222/146 H, 146 HE, 420, 222/422, 567, 568, 571, 575; 219/230, 421; 239/133, 397.5, 600, 591; 401/1, 2; 118/302; 425/564

[56] References Cited

U.S. PATENT DOCUMENTS

| | | | |
|---|---|---|---|
| 202,700 | 4/1878 | Bullock | 239/600 |
| 3,485,417 | 12/1969 | Cocks | 222/146 HE |
| 3,690,518 | 9/1972 | Baker et al. | 222/504 |
| 3,718,805 | 2/1973 | Posey | 239/133 X |
| 3,841,567 | 10/1974 | Drozer et al. | 239/570 |
| 3,952,927 | 4/1976 | Schaumburg et al. | 222/559 X |

FOREIGN PATENT DOCUMENTS

| | | | |
|---|---|---|---|
| 669525 | 8/1929 | France | 239/591 |
| 480395 | 2/1938 | United Kingdom | 239/591 |

*Primary Examiner*—Robert J. Spar
*Assistant Examiner*—Frederick R. Handren
*Attorney, Agent, or Firm*—Wood, Herron & Evans

[57] ABSTRACT

An extrusion nozzle assembly for use on a dispenser of molten hot melt adhesive. The nozzle comprises a heat conductive insert housed within a heat insulative plastic holder. A resilient seal within the holder prevents leakage between the nozzle and the dispenser when the nozzle is threaded only "finger tight" onto the dispenser.

6 Claims, 3 Drawing Figures

EXTRUSION NOZZLE ASSEMBLY

This invention relates to equipment for applying heated liquid to surfaces and more particularly, to equipment for applying beads, ribbons, or small unitary deposits of extruded heated material in a desired pattern to a substrate. Specifically, this invention relates to an extrusion nozzle intended to be removably secured to an extrusion gun or dispenser, which dispenser is intended to apply heated molten hot melt adhesive to various materials or substrates such as flat sheets or webs or paper or cardboard of the type commonly used in packaging or in adhering a variety of products.

"Hot melt" liquids are typically of the asphaltic or synthetic resin type and are generally in their solid state at room temperature. When heated to molten form, however, they change in physical state to a relatively viscous liquid which may be pumped through the nozzle of a gun or dispenser and applied to a surface in the form of a continuous bead or ribbon or as intermittent beads or deposits. Normally, such hot melt materials are converted to a molten state in a heater and then transmitted to the applicator gun or dispenser under pressure through heated lengths of flexible hose. The applicator guns are generally also heated so as to maintain the adhesive in molten form until it leaves the nozzle of the guns.

Heretofore, it has been common practice to form a complete nozzle assembly of heat transmitting metal so that heat applied to the gun is transmitted through the gun to the nozzle, whereby the nozzle orifice is maintained sufficiently hot as to prevent the molten adhesive from cooling and increasing in viscosity within the nozzle orifice.

A common problem encountered with prior art extrusion guns and nozzles occurs as a consequence of adhesive cooling in the nozzle orifice. As the adhesive cools, it increases in viscosity, and it tends to drool and string from the nozzle rather than to cut off sharply when a valve within the gun closes.

It has therefore been one objective of this invention to provide a nozzle for a hot melt adhesive extrusion gun which better heats the nozzle orifice so as to maintain the adhesive contained within the nozzle in a high temperature molten state.

Because the extrusion nozzles of prior art hot melt guns have been of all metal construction and have been required to be maintained at or close to melting temperature of the adhesive dispensed from the gun, often in excess of 300° F., the nozzles have created a danger because of operators inadvertently coming in contact with the nozzle surface and burning themselves. It has therefore been another objective of this invention to provide a nozzle assembly which is less dangerous and less subject to burning human operators if their hands or any part of their body inadvertently contact the nozzle.

Still another problem heretofore encountered with prior art extrusion nozzle assemblies has been a time lag required after start-up of the gun required for heat to be pumped from the gun to and through the nozzle so as to bring the nozzle orifice up to the melting temperature of the adhesive contained in the gun. It has therefore been another objective of this invention to provide an improved nozzle assembly which requires less time for the nozzle orifice to heat up and come up to temperature after start-up of the gun.

Yet another objective of this invention has been to provide an improved nozzle assembly for a hot melt liquid extrusion gun which accomplishes all of the objectives set forth hereinabove and which is less expansive to manufacture than have been prior art nozzle assemblies.

The extrusion nozzle of this invention which accomplishes these objectives comprises a heat insulative plastic holder within which there is mounted a small heat conductive metal insert. This insert has an axial passage which, when the nozzle assembly is mounted upon a dispenser gun, communciates with a hot melt flow passage of the gun. At the end of the metal insert, opposite from the outlet orifice, there is a flange which has a large surface area in contact with the end surface of the dispenser. Heat imparted to the gun or dispenser is conducted through the gun and through this flange into the heat insulated insert so as to maintain the adhesive contained within the flow passage of the insert at a high temperature. Between the flanged surface of the insert and the interior of the plastic holder is a resilient seal which seals the nozzle against the nozzle seat of the gun. This seal effectively prevents leakage when the nozzle is threaded only "finger tight" onto the gun. Consequently, a relatively low strength insulative plastic material may be used for the heat insulative holder.

This nozzle has numerous inherent advantages over the prior art all metal extrusion nozzle assemblies conventionally used on hot melt extrusion guns. Among those advantages is that of requiring no tools for installation or removal of the nozzle since it is only required to be threaded "finger tight" onto the gun.

Another advantage of this nozzle derives from the small size of the metal insert. Because of the small size of the metal parts, the nozzle has relatively little energy storage capacity and may therefore be quickly heated or cooled. This characteristic is advantageous because it enables the nozzle to be quickly heated and brought up to temperature when heat to the gun is initially turned on.

Very importantly, this nozzle assembly also has the advantage of costing substantially less than all metal nozzle assemblies which it replaces and which have heretofore been standard on all hot melt adhesive extrusion guns.

These and other objects and advantages of this invention may be more readily apparent from a detailed description of the drawings in which.

Figure 1:
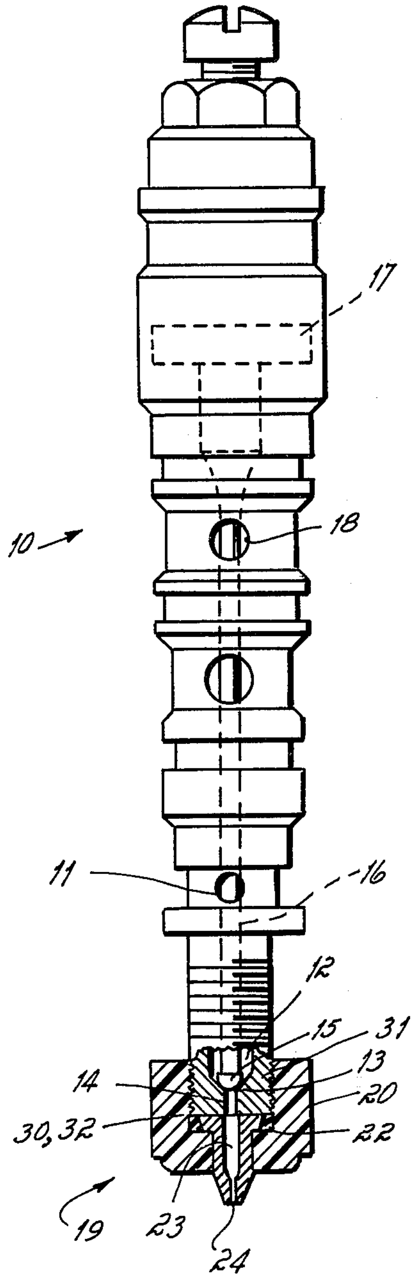
FIG. 1 is a side elevational view, partially in cross section, of a conventional hot melt adhesive dispensing gun having the novel extrusion nozzle assembly of this invention applied thereto.

Referring first to FIG. 1, there is illustrated a conventional hot melt dispensing gun 10 of the module type which is intended to be mounted within a heated modular mounting block, often referred to as a service module (not shown). This service module mounting block conventionally has passages formed therein through which molten hot melt adhesive is pumped from a melting tank through the mounting block into a radial adhesive flow passage 11 of the gun. This radial passage 11 communicates with an axial valve stem containing passage 12 through which molten adhesive flows past a valve seat 13 into the outlet passage 14 of the gun. A valve 15 mounted on the end of a valve stem 16 controls flow of molten adhesive past the valve seat 13 to the outlet passage 14. Conventionally, this molten adhesive is supplied to the radial passage 11 at a pressure on the order of three or four hundred psi such that when the valve 15 is opened, molten adhesive is extruded at a relatively high pressure out end passage 14 of the gun.

Opening and closing of the valve 15 is conventionally controlled by a piston 17 of a pneumatic motor located within the gun module 10. Air pressure to control actuation of the piston 16 is supplied through ports contained within the gun service module to a radial passage 18 of the gun.

The dispensing gun 10 and the heated service module within which the gun is mounted per se form no part of the invention of this application. Such a dispenser is well known in the prior art and is illustrated in FIG. 1 only for purposes of illustrating one environment of use for the invention of this application. The dispenser 10 is the subject of U.S. Pat. No. 3,840,158, which is assigned to the assignee of this application. For purposes of completing the disclosure of this application, the disclosure of that patent is hereby incorporated by reference.

The novel extrusion nozzle assembly 19 of this invention comprises a nozzle holder 20, an insert 21, and a resilient seal 22. When this assembly is placed on the end of a hot melt dispensing gun, an axial passage 23 of the insert communicates with the outlet passage 14 of the dispensing gun so as to form a continuation of that passage. Consequently, adhesive supplied to radial passage 11 flows through that passage and through the axial passages 12 and 14 of the gun to the outlet orifice 24 of the gun when the valve 15 is opened.

The holder 20 comprises a unitary plastic assembly which is manufactured from a heat insulative plastic material. In the preferred embodiment the holder is injection molded of a thermoplastic material. One preferred thermoplastic material is a polyphenylene sulfide material manufactured by Phillips Chemical Company under the trademark "RYTON". A grade R-4 RYTON material having a 40% glass content has been found to be particularly suitable for this application because of its capability of operating at a temperature of 475° F.

The holder 20 has a stepped axial bore 25 extending therethrough. The larger diameter section of this bore is threaded as illustrated at 26. The metal insert 21 is mounted within the smaller diameter section 27 of the bore and has a radial flange 28 seated against a shoulder 29 defined between the two different diameter sections 25–27 of the bore. The insert 21 is manufactured from a metal which has a high thermal conductivity. Examples of metals which are suitable because of their thermal conductivity properties are copper alloy, aluminum, brass, or silver. In the preferred embodiment the insert 21 is manufactured from a No. 360 brass alloy.

As may be seen most clearly in FIG. 1, inner end surface 30 of the insert is flat. When the nozzle assembly is threaded onto the threaded end 31 of the gun, the end surface 30 contacts the flat end surface or end seat 32 of the gun. The nosepiece or end 31 of the gun upon which the flat seat 32 is located is manufactured from a heat transmitting metal such as brass so that heat imparted to the gun 10 from its service module (not shown) is transmitted through the nosepiece and through the metal to metal surface between seat 32 and end surface 30 to the insert. This heat is then conducted through the thermally conductive metal of the insert to the generally bullet-shaped end 32 of the nozzle within which the orifice 24 is located. Consequently, the orifice 24 is maintained at a temperature above the melting temperature of the molten adhesive supplied to the gun.

Between the outer edge of the flange 28 of the insert 21 and the surface of the bore 26 there is a generally semi-dovetail shaped slot 35. The resilient seal 22 is located within this slot.

Figure 2:
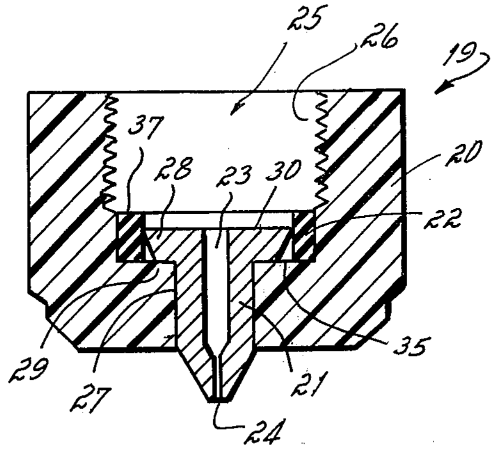
FIG. 2 is a cross-sectional view of the nozzle assembly of FIG. 1 but removed from the gun.

In the preferred embodiment illustrated in FIGS. 1 and 2, this seal is an annular seal which is rectangular in cross section. One flexible material which has been found to be suitable for this application is a number 50 durometer silicon rubber.

The presence of the resilient seal 22 between the insert 21 and the holder 20 enables the holder 20 to be manufactured from a material which does not have the high tensile strength of metal. Most plastic materials would fracture if tightened to the point at which they would effect a "metal to metal" seal between the seat 32 of the gun and the end surface 30 of the insert. Because resilient seal 22 though, is operative to prevent leakage between the nozzle and the gun when the nozzle is threaded onto the gun only "finger tight," there is no need for a high tensile strength holder 20. Consequently, the holder may be manufactured of a relatively low strength, heat insulative, plastic material.

Figure 3:
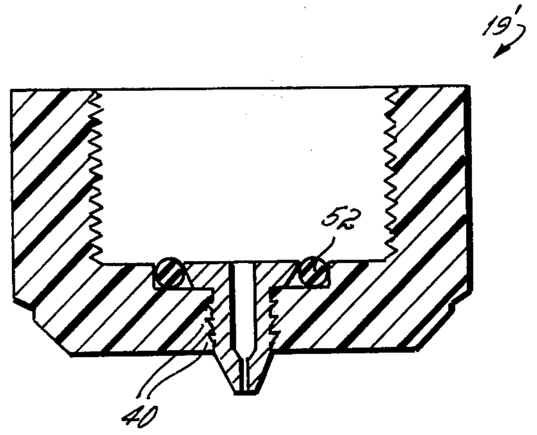
FIG. 3 is a cross-sectional view of a second modification of a nozzle assembly incorporating the invention of this application.

The insert 21 is fixedly secured within the small diameter section 27 of the bore 25. This securement may be by press fitting the insert 21 into the bore 27 or by adhesively securing the insert within the bore. Alternatively, if the insert is provided with barbs 40, as illustrated in FIG. 3, the insert may be fixedly secured within the bore 27 by heating the insert and holder interface with either ultrasonic vibration or thermal conduction while the insert is pressed into the bore. If either of these techniques is used, the plastic material of the holder is melted as the insert is pushed into the holder. Removal of the heating source allows the thermoplastic material to solidify around the barbs thereby fixedly securing the insert to the holder. Alternatively, the holder may be molded around the metal insert 21. In that event, the metal insert is placed into the mold within which the holder 20 is formed before introduction of the plastic material in the mold.

In use, the nozzle assembly 19 is threaded onto the threaded nospiece or end 31 of the dispenser gun until the inner end surface 37 of the seal 22 contacts the seat 32 of the nosepiece. Continued threading of the holder of the nosepiece results in the seal 22 being compressed into the semi-dovetail shaped slot or channel 35 until the end surface 30 of the insert contacts the seat 32 of the dispenser.

When the gun is to be used, it is first heated by a heater (not shown) contained within the service module within which the gun is mounted. Heat from the service module is imparted to the gun and subsequently from the gun to the nozzle. The presence of the surface to surface metal contact between the seat 32 of the gun and the end surface 30 of the insert enables heat to be quickly conducted from the gun to the insert to bring the nozzle orifice up to temperature. In one application, the insert was heated to an application temperature of approximately 350° within one minute after being installed on a gun, which was at application temperature. This was approximately 50% faster than the time previously required to heat up the orifice of an all metal nozzle assembly in which the insert was contained within a metal holder. In the course of bringing the insert up to temperature, the surface temperature of the holder 20 reached only 200° F., a temperature at which it could be contacted for several seconds by a human operator without suffering a burn.

Referring now to FIG. 3, and the second embodiment of the nozzle assembly 19' there illustrated, it will be seen that in addition to this nozzle assembly differing from the nozzle assembly illustrated in FIG. 2 because of the presence of the barbs 40 on the periphery of the insert, this assembly also differs because of the use of an O-ring seal 52 rather than a square cross section annular seal as in FIG. 1. One resilient O-ring seal material which has been found to be suitable to this application is manufactured under the trademark VITON. Of course, any resilient sealing material is suitable for this application so long as it retains its resiliency in the temperature range of the molten adhesive.

Both embodiments of the nozzle assembly of this invention have numerous advantages over the all metal extrusion nozzles which to our knowledge have heretofore been used exclusively with hot melt adhesive guns. For example, the all metal nozzle assemblies of the prior art have almost always been manufactured of two or more separable pieces. The unitized nozzle assembly of this invention though is easier and quicker to install than the multiple separable parts of the prior art.

Another advantage which accrues from the unique characteristics of the nozzle assembly of this invention is that it requires no tools for installation and removal. It need only be threaded onto the gun until "finger tight" to effect a seal between the nozzle and the gun. Consequently, no tools are required to grasp and turn the nozzle holder onto the end of the gun.

Another advantage which accrues from this invention is attributable to the heat transmitting properties of the plastic holder of the nozzle assembly. The surface of this material is substantially lower in temperature than would be the case if the holder were made of metal. Additionally, because the plastic transmits heat much less rapidly than does metal, it is much less likely to cause burns to human operators coming in contact with the nozzle.

Still another advantage of the novel nozzle assembly of this invention is attributable to the relatively small amount of metal in the nozzle assembly. Because the insert is the only metal part, the nozzle of this invention has very little capacity for storing heat. Therefore, it will quickly come up to temperature when the gun is initially turned on. This characteristic is advantageous for enabling a production line utilizing this equipment to be quickly started after nozzle replacements.

Yet another advantage of this invention is attributable to the fact that it maintains the temperature of molten adhesive contained within the orifice of the nozzle at a higher temperature than does an otherwise identical but all metal nozzle. The higher the temperature of the molten adhesive, the less is the tendency for the material to drool or string from the nozzle when the valve of the gun closes. Consequently, the use of the nozzle of this invention reduces drooling and stringing problems otherwise inherent in applications which require high speed cycling of the gun with sharp cut off of the material ejected from the gun.

While we have described only two embodiments of our invention, persons skilled in the art to which this invention pertains will also appreciate various modifications and changes which may be made without departing from the spirit of our invention. Therefore, we do not intend to be limited except by the scope of the following appended claims:

We claim:

1. An extrusion nozzle adapted to be removably secured to the end of a heated hot melt adhesive dispenser of the type having a valve contained therein, said nozzle comprising a heat insulative holder having connector means formed thereon for removably securing said holder to said dispenser, said holder having an axial bore extending therethrough, a heat transmitting metal insert, said insert having an axial passage extending therethrough terminating in an outlet orifice, said insert having a generally tubular section and a radial flange extending outwardly from said tubular section at one end remote from said outlet orifice, said insert flange having a flat end surface adapted to be placed in metal to metal surface contact with a flat heated surface of said dispenser when said holder is secured to said dispenser so as to facilitate transfer of heat from said flat heated surface of said dispenser to said insert flange, said flange and the major portion of said tubular section of said metal insert being contained within said bore of said holder so that heat transferred from said dispenser to said flange of said insert is readily transferred to the outlet orifice end of said insert with a minimum of heat loss, and resilient sealing means contacting said flange of said insert for forming a seal between said insert and said dispenser.

2. An extrusion nozzle adapted to be removably secured to one end of a heated hot melt adhesive dispenser, said one end of said dispenser terminating in a heated flat metal surface having an outlet passage therein, said nozzle comprising, a unitary heat insulative plastic holder having an axial bore therethrough, said holder having threaded fastener means formed thereon for removably securing said holder to said one end of said dispenser, a heat transmitting metal insert fixedly secured within said axial passage of said holder, said insert having an axial passage extending therethrough terminating in an outlet orifice, said insert having a generally tubular section terminating in a radial flange extending outwardly from one end of said tubular section, said flange having a flat end surface adapted to be placed in metal to metal surface contact with said flat end surface of said dispenser when said holder is secured onto said dispenser, said flange and the major portion of said tubular section of said metal insert being contained within said bore of said holder so that heat transferred from said dispenser to said flange of said insert is readily transferred to the outlet orifice end of said insert with a minimum of heat loss, and a resilient seal contained within said holder contacting said flange of said insert, said seal being operable to form a liquid tight seal between said nozzle and said dispenser when said nozzle is secured onto said dispenser.

3. The extrusion nozzle of claim 2 in which said sealing means comprises an annular resilient sealing ring contained within an annular channel formed between said one end of said insert and said axial passage of said holder.

4. The extrusion nozzle of claim 2 in which said insert has outwardly extending barbs formed on the periphery thereof for securing said insert within said holder.

5. In combination, a hot melt adhesive dispenser and an extrusion nozzle removably secured to said dispenser, said dispenser having an inlet for molten adhesive, an outlet, and a flow passage interconnecting said inlet and said outlet, a valve contained within said flow passage for controlling flow of said molten adhesive from said outlet, said flow passage being located within a heated metal portion of said dispenser, said heated metal portion of said dispenser terminating in a heated flat metal surface having said outlet therein, said nozzle comprising a unitary heat insulative plastic holder having an axial bore therethrough, said holder having threaded fastener means formed thereon for removably securing said holder to said one end of said dispenser, a heat transmitting metal insert fixedly secured within said axial bore of said holder, said insert having an axial passage extending therethrough terminating in an outlet orifice, said insert having a generally tubular section terminating in a radial flange extending outwardly from one end of said tubular section, said flange having a flat end surface in metal to metal surface contact with said flat end surface of said metal portion of said dispenser when said holder is secured onto said dispenser, said flange and the major portion of said tubular section of said metal insert being contained within said bore of said holder so that heat transferred from said dispenser to said flange of said insert is readily transferred to the outlet orifice end of said insert with a minimum of heat loss, and a resilient seal contained within said holder contacting said flange of said insert, said seal being operable to form a liquid tight seal between said nozzle and said dispenser when said nozzle is secured onto said dispenser.

6. The combination of claim 5 in which said sealing means comprises an annular resilient sealing ring contained within an annular channel formed between said one end of said insert and said axial passage of said holder.

* * * * *